United States Patent
Akui (10) Patent No.: US 12,527,461 B2
(45) Date of Patent: Jan. 20, 2026

(54) ENDOSCOPE

(71) Applicant: OLYMPUS CORPORATION, Tokyo (JP)

(72) Inventor: Nobuaki Akui, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 483 days.

(21) Appl. No.: 18/078,520

(22) Filed: Dec. 9, 2022

(65) Prior Publication Data

US 2023/0148840 A1    May 18, 2023

Related U.S. Application Data

(63) Continuation of application No. PCT/JP2020/024594, filed on Jun. 23, 2020.

(51) Int. Cl.
*A61B 1/018* (2006.01)
*A61B 1/00* (2006.01)
*A61B 90/00* (2016.01)

(52) U.S. Cl.
CPC ...... *A61B 1/00128* (2013.01); *A61B 1/00066* (2013.01); *A61B 1/018* (2013.01);
(Continued)

(58) Field of Classification Search
CPC ............ A61B 1/00103; A61B 1/00128; A61B 1/00119; A61B 1/00066; A61B 1/018;
(Continued)

(56) References Cited

U.S. PATENT DOCUMENTS 5,735,793 A * 4/1998 Takahashi .......... A61B 1/00128
600/153
2013/0253268 A1* 9/2013 Okada ...................... A61B 1/07
600/104

(Continued)

FOREIGN PATENT DOCUMENTS

JP    H07-194522 A    8/1995
JP    H08-19514 A     1/1996
(Continued)

OTHER PUBLICATIONS

International Search Report dated Sep. 8, 2020 received in PCT/JP2020/024594.

*Primary Examiner* — Michael J Carey
*Assistant Examiner* — Olivia Grace Starkey
(74) *Attorney, Agent, or Firm* — Scully, Scott, Murphy & Presser, P.C.

(57) ABSTRACT

An endoscope includes a channel tube provided in a direction of a longitudinal axis of an insertion section, and a pipe sleeve provided in the operation section and including a tube insertion hole on a distal end side, the proximal end side of the channel tube being inserted in the tube insertion hole. An inner diameter at a first position on a proximal end side of the pipe sleeve is larger than an inner diameter at a second position in a hole part that communicates with a proximal end of the tube insertion hole, the inner diameter at the second position of the pipe sleeve is smaller than an inner diameter at a third position in the tube insertion hole, and the pipe sleeve includes an abutting surface at the proximal end of the tube insertion hole.

13 Claims, 9 Drawing Sheets

(52) U.S. Cl.
CPC .......... *A61B 90/03* (2016.02); *A61B 1/00103* (2013.01); *A61B 1/00119* (2013.01); *A61B 2090/034* (2016.02)

(58) Field of Classification Search
CPC ................ A61B 1/00135; A61B 90/03; A61B 2090/034
See application file for complete search history.

(56) References Cited

U.S. PATENT DOCUMENTS

| | | | | |
|---|---|---|---|---|
| 2016/0174819 | A1* | 6/2016 | Ouyang | A61B 1/00098 600/105 |
| 2017/0202438 | A1* | 7/2017 | Ogi | A61B 1/0052 |
| 2020/0146537 | A1* | 5/2020 | Harada | A61B 1/00101 |

FOREIGN PATENT DOCUMENTS

| | | |
|---|---|---|
| JP | 2001-061775 A | 3/2001 |
| JP | 2009-039205 A | 2/2009 |
| JP | 2009-039465 A | 2/2009 |
| JP | 2009-285310 A | 12/2009 |
| JP | 2010-069003 A | 4/2010 |
| WO | 2021/176660 A1 | 9/2021 |

* cited by examiner

FIG. 9

ENDOSCOPE

CROSS REFERENCE TO RELATED APPLICATION

This application is a continuation application of PCT/JP2020/024594 filed on Jun. 23, 2020, the entire contents of which are incorporated herein by this reference.

BACKGROUND OF THE INVENTION

1. Field of the Invention

The present invention relates to an endoscope having a channel tube for allowing insertion of a treatment instrument and performing air feeding, water feeding, or the like.

2. Description of the Related Art

Endoscopes are widely utilized in a medical field nowadays. The endoscopes enable organs in a body cavity as a subject to be observed by inserting an elongated insertion section into the body cavity. Further, an endoscope includes a channel tube inserted through the insertion section to enable various types of treatments to be performed using a treatment instrument inserted through the channel tube, and enable air feeding, water feeding, or the like through the channel tube to be performed.

A proximal end side of such a channel tube is connected to a tubular member such as a forceps pipe sleeve provided in an operation section. In this case, in order to ensure watertightness of a connection part between the channel tube and the forceps pipe sleeve or the like, the channel tube is commonly fixed to the forceps pipe sleeve or the like by bonding.

Japanese Patent Application Laid-Open Publication No. 2009-39465, for example, discloses a tube fixing member for fixing a piping tube (channel tube) to a piping pipe (tubular member) having a circumferential projection formed on an outer circumferential surface. The tube fixing member includes an inner tube overlaid on the piping tube so as to be slidable in an axis line direction and an outer tube overlaid on the inner tube so as to be slidable in the axis line direction, and a plurality of slits and a circumferential groove are formed in the inner tube. Then, the tube fixing member causes the circumferential groove to engage with a bulging part of the tube formed by the piping pipe, and slides the outer tube to press the bulging part, so that the piping tube can be connected to the piping pipe.

SUMMARY OF THE INVENTION

An endoscope according to an aspect of the present invention includes an insertion section inserted into a body of a subject, an operation section provided on a proximal end side of the insertion section, a channel tube provided in a direction of a longitudinal axis of the insertion section, a proximal end side of the channel tube being arranged in the operation section, and a pipe sleeve provided in the operation section and including a tube insertion hole on a distal end side, the proximal end side of the channel tube being inserted in the tube insertion hole, in which an inner diameter at a first position on a proximal end side of the pipe sleeve is larger than an inner diameter at a second position in a hole part that communicates with a proximal end of the tube insertion hole of the pipe sleeve, the inner diameter at the second position of the pipe sleeve is smaller than an inner diameter at a third position in the tube insertion hole, and the pipe sleeve includes an abutting surface at the proximal end of the tube insertion hole, the abutting surface abutting on the proximal end side of the channel tube.

DETAILED DESCRIPTION OF THE PREFERRED EMBODIMENTS

Hereinafter, an embodiment of the present invention will be described with reference to the drawings. The drawings are related to an embodiment of the present invention, and FIG. 1 is a side view showing an endoscope.

Figure 1:
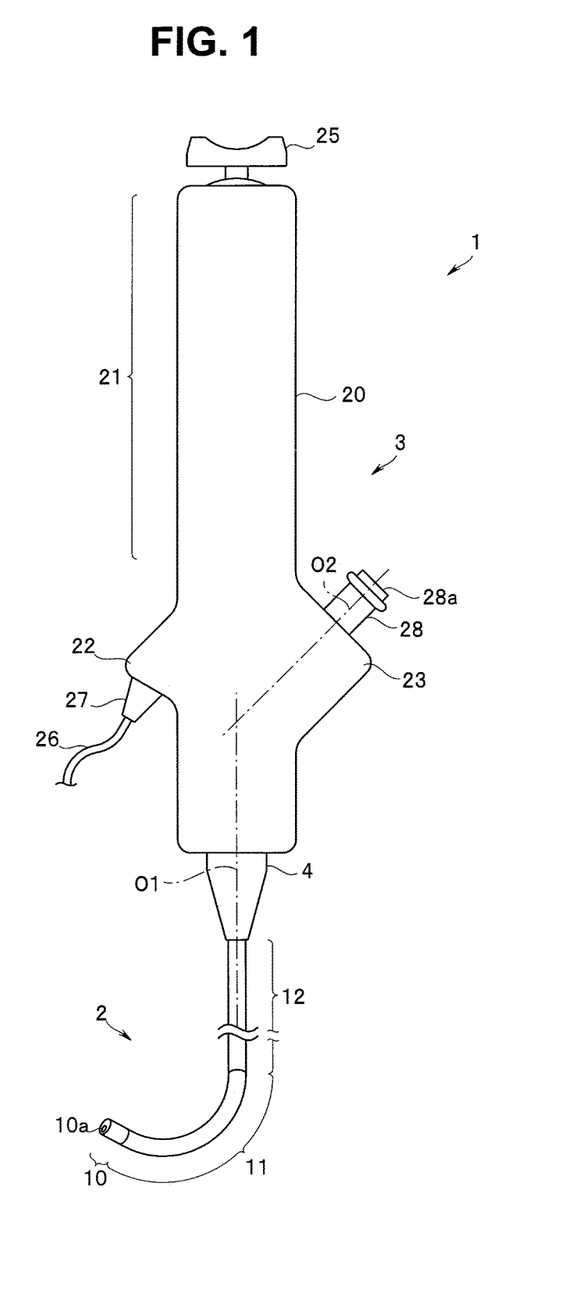
FIG. 1 is a left side view showing an endoscope.

An endoscope 1 shown in FIG. 1 is an endoscope adapted to observation and treatment of kidney pelvis, a ureter, or the like, and is a disposable endoscope without the intention of reuse in the present embodiment. An essential part of the endoscope 1 is configured to include an elongated insertion section 2 inserted into a subject, an operation section 3 provided in a manner coupled to a proximal end side of a longitudinal axis (central axis) O1 of the insertion section 2 with the interposition of a bend preventing portion 4.

An essential part of the insertion section 2 is configured to include a distal end portion 10, a bending portion 11, and a flexible tube portion 12 sequentially from a distal end side in a direction along the longitudinal axis O1.

An image pickup unit connected to a signal line and illumination optics configured to irradiate the subject with illumination light transmitted by a light guide bundle (neither shown), for example, are provided inside the distal end portion 10.

The distal end portion 10 is further provided with a channel opening part 10a to be connected to a distal end of a channel tube 15 (see FIGS. 2 and 3) which will be described later.

The bending portion 11 is configured so as to be bendable in four directions of up, down, left and right directions, for example, in accordance with an operation of a bending operation lever 25 which will be described later provided in the operation section 3.

The flexible tube portion 12 is configured by a tubular member having flexibility.

The operation section 3 has an enclosure 20 having a substantially rectangular parallelepiped shape which is long in a direction of the longitudinal axis O1 of the insertion section 2, for example, and a region from an intermediate place of the operation section 3 to the proximal end side is set as a grasping section 21 for a user or the like to grasp the operation section 3.

The bending operation lever 25 is provided at the proximal end of the operation section 3. In the present embodiment, the bending operation lever 25 is a joystick-type operation lever, for example, and is configured so as to be movable in a tilted manner in all the directions including the front, back, left and right directions as viewed from the user grasping the grasping section 21 such that the distal end side (the insertion section 2 side) is directed to the lower side. Then, the user or the like is able to operate the bending operation lever 25 to move in a tilted manner with the thumb of a hand grasping the grasping section 21, for example. Note that although four bending operation wires (not shown) caused to extend in a protruding manner from the insertion section 2 into the operation section 3, for example, are connected to the bending operation lever 25 so as to operate the bending portion 11 in a bending manner in conjunction with the tilted movement of the bending operation lever 25, these components are well known and explanation is thus omitted.

A front-side projecting portion 22 having a substantially triangular side view shape is provided on a front side of the operation section 3 closer to the distal end side than the grasping section 21. A universal cable 26 through which the signal line, the light guide bundle, and the like from the insertion section 2 are inserted is caused to extend in a protruding manner from a lower surface of the front-side projecting portion 22. More specifically, a bend preventing portion 27 is held on a screen side of the front-side projecting portion 22, and the universal cable 26 penetrates the bend preventing portion 27 and is caused to extend in a protruding manner obliquely downward.

A rear-side projecting portion 23 having a substantially triangular side view shape is further provided on a rear surface side of the operation section 3 on the distal end side with respect to the grasping section 21. A forceps pipe sleeve 28 as a tubular member is caused to protrude from an upper surface of the rear-side projecting portion 23. In other words, the forceps pipe sleeve 28 of the present embodiment is caused to protrude obliquely upward from the upper surface of the rear-side projecting portion 23 so as to ensure excellent insertion performance when the user or the like inserts a treatment instrument with a hand opposite to the hand grasping the grasping section 21. Consequently, the forceps pipe sleeve 28 of the present embodiment is set such that a central axis O2 passing through a treatment instrument insertion opening 28a as an opening part is different from the axial direction of the central axis O1 of the insertion section 2 (that is, such that the central axis O2 intersects with the central axis O1 inside the operation section 3).

Inside the operation section 3, the channel tube 15 extending in a protruding manner from the insertion section 2 is connected to the forceps pipe sleeve 28. Herein, the channel tube 15 is made of a material having excellent sliding performance, such as polytetrafluoroethylene, so as to improve insertion performance of the treatment instrument and the like.

Next, a configuration on the distal end side of the operation section 3 will be described with reference to FIGS. 2 and 3.

Figure 3:
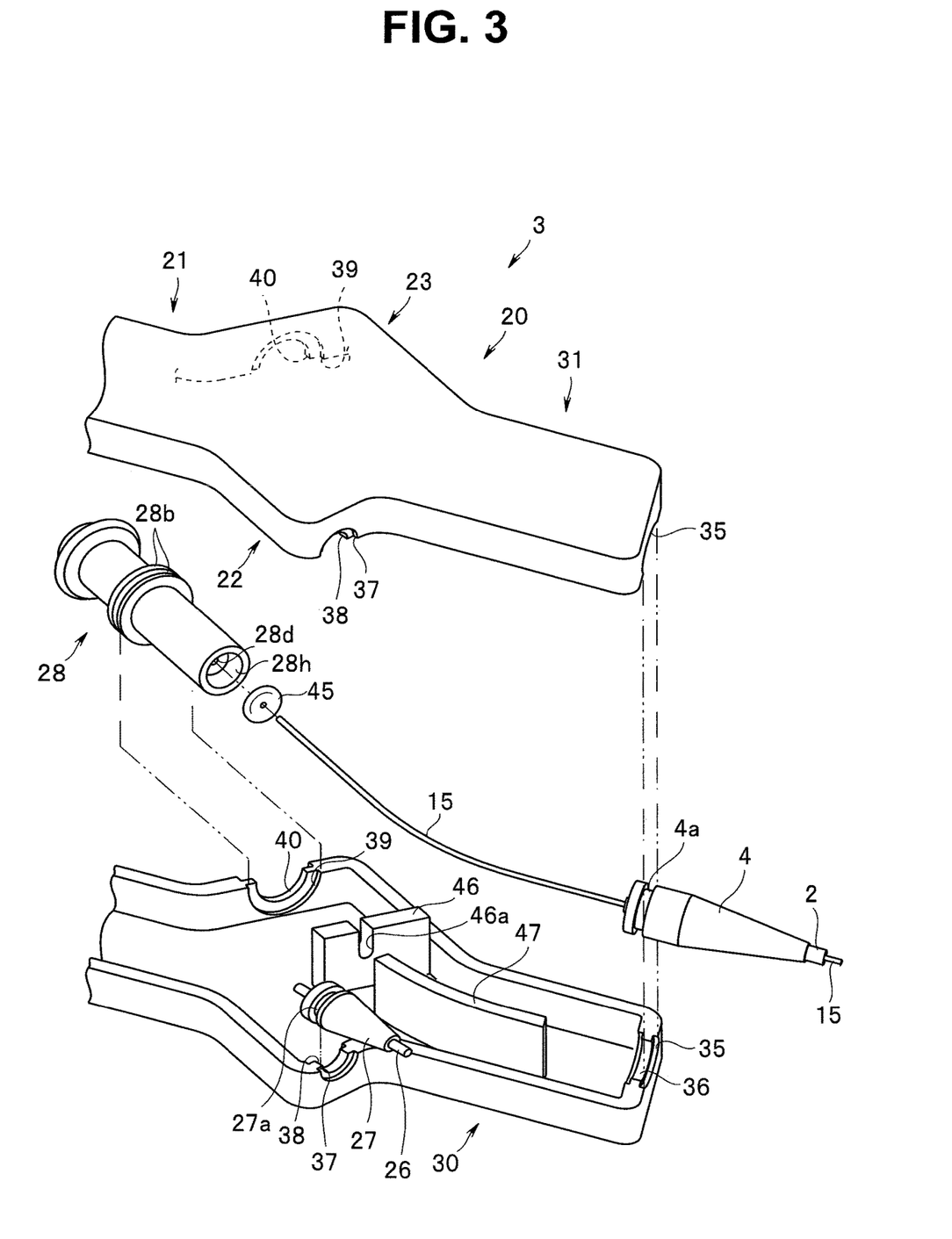
FIG. 3 is an exploded perspective view showing the essential part of the operation section.

As shown in FIG. 3, the enclosure 20 that configures the operation section 3 of the present embodiment is formed separately to the left and right by a first enclosure member 30 that mainly configures a right portion and a second enclosure member 31 that mainly configures a left portion.

Recessed parts 35 each having a semicircular shape with a diameter substantially identical to the diameter of a proximal end side of the bend preventing portion 4 are respectively provided in wall parts that form distal end surfaces of the first enclosure member 30 and the second enclosure member 31. Further, keys 36 each having a semicircular shape protruding in a radially inner direction are respectively provided in the respective recessed parts 35.

The respective recessed parts 35 and the respective keys 36 are intended for forming a stepped through-hole having a circular shape as a whole when the first enclosure member 30 and the second enclosure member 31 are joined, and holding a proximal end side of the insertion section 2 in the operation section 3 with the interposition of the bend preventing portion 4.

In order to achieve such holding, a key groove 4a to be fitted over the respective keys 36 is provided on a proximal end side of the bend preventing portion 4.

Then, when the first enclosure member 30 and the second enclosure member 31 are joined, a proximal end portion of the bend preventing portion 4 is held between the respective recessed parts 35, and the respective keys 36 are fitted in the key groove 4a. This causes the bend preventing portion 4 holding a proximal end side of the insertion section 2 to be fixed in a state positioned on the enclosure 20 in a predetermined manner. Then, such fixing of the bend preventing portion 4 causes the proximal end side of the insertion section 2 to be provided in a manner coupled to the operation section 3.

In the first enclosure member 30 and the second enclosure member 31, recessed parts 37 each having a semicircular shape with a diameter substantially identical to the diameter of a proximal end side of the bend preventing portion 27 are respectively provided in a wall part that forms the lower surface of the front-side projecting portion 22. Further, keys 38 each having a semicircular shape protruding in the radially inner direction are respectively provided in the respective recessed parts 37.

The respective recessed parts 37 and the respective keys 38 are intended for forming a stepped through-hole having a circular shape as a whole when the first enclosure member 30 and the second enclosure member 31 are joined, and holding a proximal end side of the universal cable 26 with the interposition of the bend preventing portion 27.

In order to achieve such holding, a key groove 27a to be fitted over the respective keys 38 is provided on the proximal end side of the bend preventing portion 27.

Then, when the first enclosure member 30 and the second enclosure member 31 are joined, a proximal end portion of the bend preventing portion 27 is held between the respective recessed parts 37, and the respective keys 38 are fitted in the key groove 27a. This causes the bend preventing portion 27 holding the proximal end side of the universal cable 26 to be fixed in a state positioned on the enclosure 20 in a predetermined manner. In other words, such fixing of the bend preventing portion 27 causes the proximal end side of the universal cable 26 to be provided in a manner coupled to the operation section 3.

In the first enclosure member 30 and the second enclosure member 31, recessed parts 39 each having a semicircular shape with a diameter larger than an outer diameter of the forceps pipe sleeve 28 are respectively provided in a wall part that forms the upper surface of the rear-side projecting portion 23. Further, keys 40 each having a semicircular shape protruding in the radially inner direction are respectively provided in the respective recessed parts 39.

The respective recessed parts 39 and the respective keys 40 are intended for forming a stepped through-hole having a circular shape as a whole when the first enclosure member 30 and the second enclosure member 31 are joined, and holding an intermediate place of the forceps pipe sleeve 28 in the operation section 3.

In order to achieve such holding, a pair of outward flanges 28b each having a diameter substantially identical to the diameter of the recessed parts 39 are provided in the intermediate place of the forceps pipe sleeve 28 at an interval substantially identical to the width of the keys 40.

Then, when the first enclosure member 30 and the second enclosure member 31 are joined, the respective outward flanges 28b are held between the respective recessed parts 39 with the interposition of the respective keys 40. This causes the forceps pipe sleeve 28 to be fixed in a state positioned on the operation section 3 in a predetermined manner such that a proximal end side protrudes to the outside of the enclosure 20 and a distal end side is arranged inside the enclosure 20.

Figure 2:
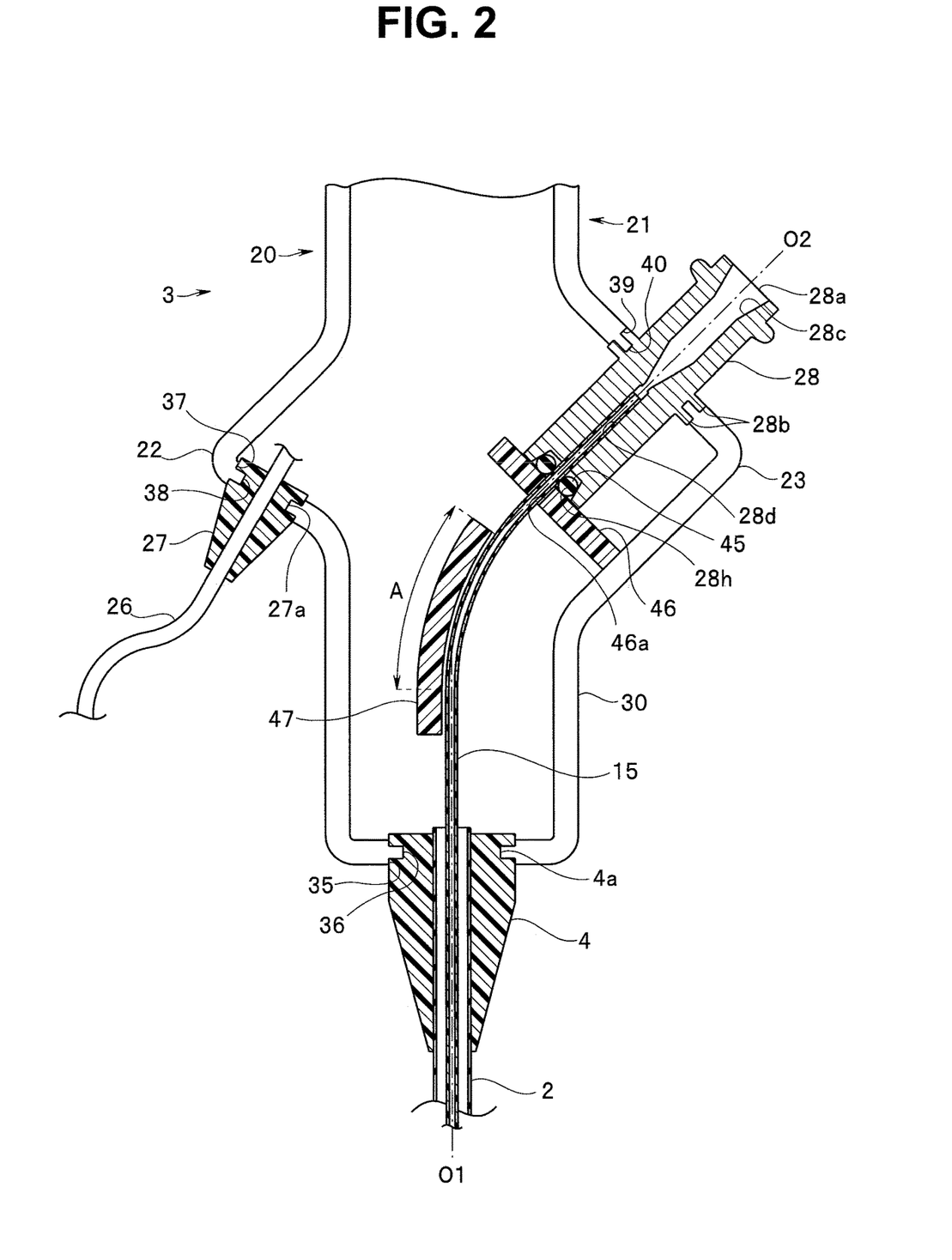
FIG. 2 is a cross-sectional view showing an essential part of an operation section.
Figure 4:
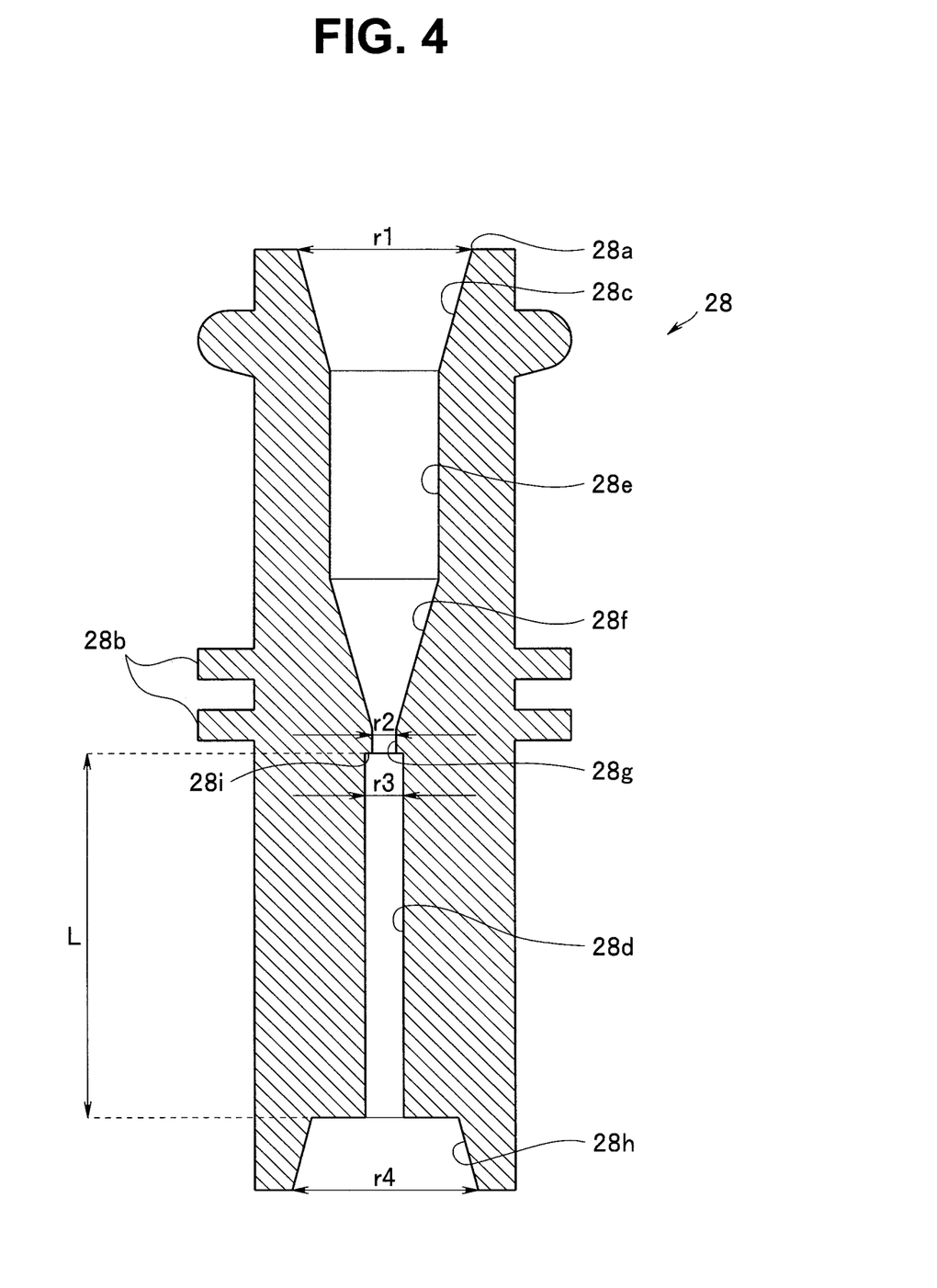
FIG. 4 is a cross-sectional view of a pipe sleeve.

Herein, as shown in FIGS. 2 and 4, a first tapering hole 28c that decreases in diameter from the treatment instrument insertion opening 28a as a proximal end toward a distal end side is provided inside the forceps pipe sleeve 28 on the proximal end side. The first tapering hole 28c is a hole for connecting a syringe or the like not shown, and has an inner diameter, a taper angle, and the like strictly managed.

On the other hand, a tube insertion hole 28d having a diameter substantially identical to the diameter of the channel tube 15 is provided inside the forceps pipe sleeve 28 on the distal end side. The tube insertion hole 28d is caused to extend with a length L more than or equal to a predetermined length in the direction of the central axis O2 of the forceps pipe sleeve 28, and allows insertion of a proximal end side of the channel tube 15. Herein, "having a diameter substantially identical" means that the outer diameter of the channel tube 15 and the inner diameter of the tube insertion hole 28d substantially match within a range that allows manufacturing tolerances. More specifically, "having a diameter substantially identical" indicates that the outer diameter of the channel tube 15 and the inner diameter of the tube insertion hole 28d substantially match to such a degree that the channel tube 15 can be inserted in the tube insertion hole 28d even in a case where there are manufacturing tolerances. The length of the tube insertion hole 28d in this case is set to be sufficiently longer than the length (a design value) of the channel tube 15 on the proximal end side designed to be inserted in the tube insertion hole 28d.

Inside the forceps pipe sleeve 28, a first cylindrical hole 28e is provided in a manner coupled to a distal end of the first tapering hole 28c.

Inside the forceps pipe sleeve 28, a second tapering hole 28f that decreases in diameter from the proximal end side toward the distal end side communicates with a distal end of the first cylindrical hole 28e.

Inside the forceps pipe sleeve 28, a second cylindrical hole 28g as a hole part communicates with a distal end of the second tapering hole 28f.

The first cylindrical hole 28e, the second tapering hole 28f, and the second cylindrical hole 28g are intended for relaying the first tapering hole 28c and the tube insertion hole 28d.

Inside the forceps pipe sleeve 28, a seal holding hole 28h as an elastic member storage part communicates with a distal end of the tube insertion hole 28d. The seal holding hole 28h is formed by a recessed part provided in a recessed manner from a distal end surface of the forceps pipe sleeve 28 in a direction of the longitudinal axis O2.

Then, a continuous through-hole that penetrates the forceps pipe sleeve 28 from the proximal end side to the distal end side is formed by the first tapering hole 28c, the first cylindrical hole 28e, the second tapering hole 28f, the second cylindrical hole 28g, the tube insertion hole 28d, and the seal holding hole 28h.

Herein, an inner diameter r1 at a proximal end (a first position) of the first tapering hole 28c is set to be larger than an inner diameter r2 in the second cylindrical hole 28g (a second position) that communicates with the tube insertion hole 28d. The inner diameter r2 in the second cylindrical hole 28g (the second position) is set to be smaller than an inner diameter r3 in the tube insertion hole 28d (a third position). The inner diameter r2 in the second cylindrical hole 28g (the second position) is set to be smaller than or equal to an inner diameter of the channel tube 15. An inner diameter r4 in the seal holding hole 28h (a fourth position) is set to be larger than the inner diameter r3 in the tube insertion hole 28d (the third position).

The inner diameter r2 in the second cylindrical hole 28g (the second position) and the inner diameter r3 in the tube insertion hole 28d (the third position) change discontinuously. Accordingly, an abutting surface 28i on which a proximal end of the channel tube 15 can abut is formed at a proximal end of the tube insertion hole 28d.

Inside the operation section 3 (the enclosure 20), the channel tube 15 caused to extend in a protruding manner from a proximal end of the insertion section 2 is connected to the tube insertion hole 28d of the forceps pipe sleeve 28 by insertion. In order to ensure airtightness and liquid tightness between the forceps pipe sleeve 28 and the channel tube 15, an O-shaped ring 45 as an elastic member is held in the seal holding hole 28h in a state penetrated by the channel tube 15.

Describing specifically, the proximal end side of the channel tube 15 inserted through the insertion section 2 is caused to directly extend in a protruding manner inside the operation section 3 without being connected to a relay channel tube or the like.

The channel tube 15 is arranged inside the operation section 3 in a state bent from the axial direction of the central axis O1 of the insertion section 2 toward the axial direction of the central axis O2 of the forceps pipe sleeve 28. Then, the proximal end side of the channel tube 15 is inserted in the tube insertion hole 28d in an unbonded state after penetrating the O-shaped ring 45.

Note that since the material such as polytetrafluoroethylene is commonly a material having a low affinity with an adhesive, pretreatment such as etching treatment (tetra-etch treatment) needs to be performed when bonding the channel tube 15 made of polytetrafluoroethylene or the like. However, since the channel tube 15 of the present embodiment is inserted in the tube insertion hole 28d in the unbonded state, etching treatment or the like is not performed.

Herein, a partition wall 46 as a restriction member is provided inside the enclosure 20 at a position proximate and opposed to a distal end of the forceps pipe sleeve 28 held in the enclosure 20 (see FIGS. 2 and 3).

The partition wall 46 is intended for preventing the O-shaped ring 45 from coming off the seal holding hole 28h. Thus, the partition wall 46 is arranged at a position where the interval from the distal end of the forceps pipe sleeve 28 is less than the thickness of the O-shaped ring 45 (more preferably, less than ½ of the thickness of the O-shaped ring 45), and is formed integrally with the first enclosure member 30, for example. The partition wall 46 is provided with a slit 46a having a substantially U-shape, and the channel tube 15 is inserted in the tube insertion hole 28d in a state having passed through the slit 46a.

Watertightness can be ensured without bonding insofar as the O-shaped ring 45 has an outer diameter having a size larger than or equal to an opening of the seal holding hole 28h provided on the distal end side of the forceps pipe sleeve 28 and an inner diameter smaller than or equal to the outer diameter of the channel tube 15. A force of the O-shaped ring 45 to return to an original state under compression restricts coming off of the channel tube 15.

Figure 5:
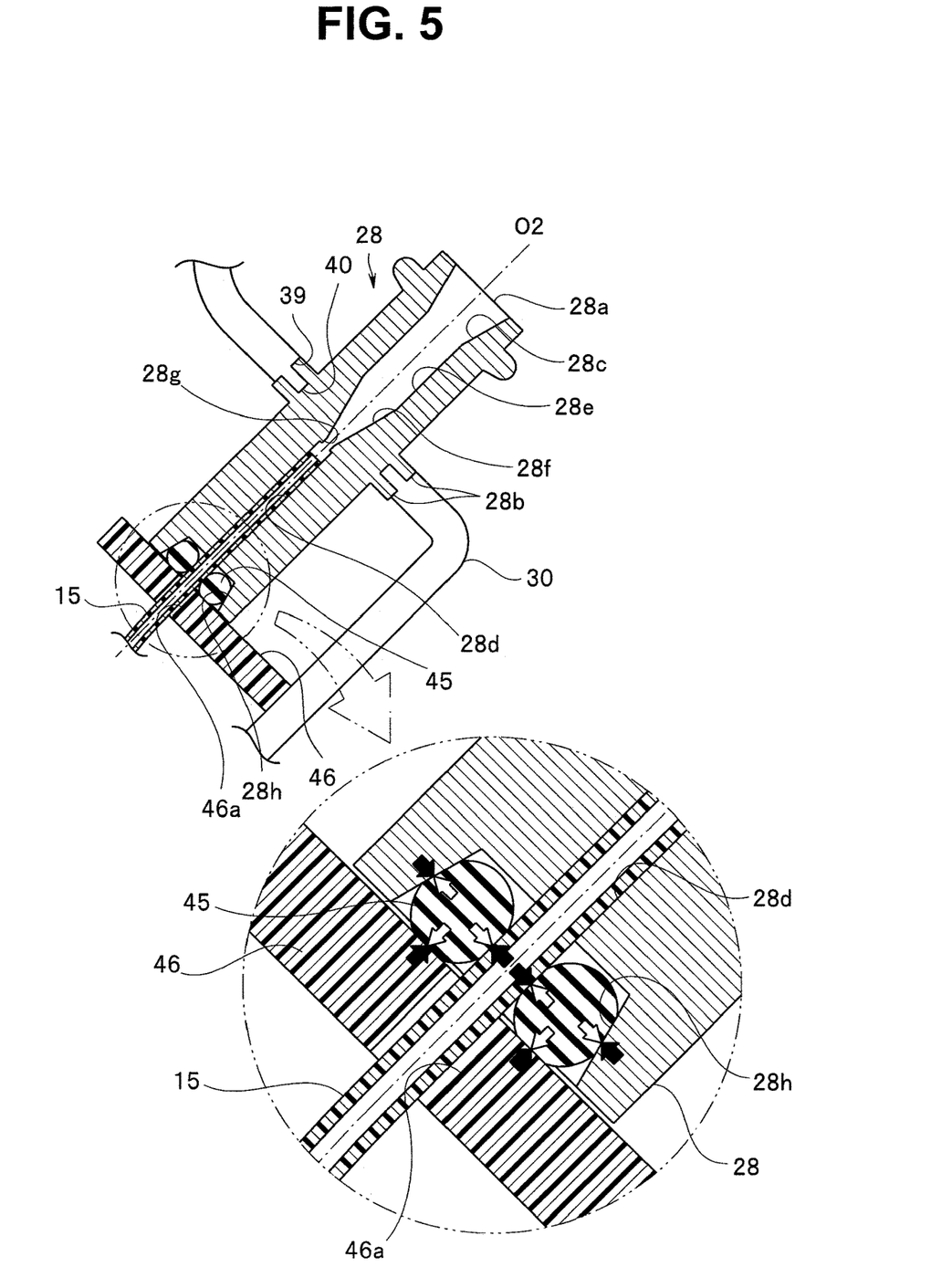
FIG. 5 is an explanatory diagram of a contact stress acted on an O-shaped ring.

In other words, when the O-shaped ring 45 in a state through which the channel tube 15 is inserted is inserted in the seal holding hole 28h as shown in FIG. 5, the O-shaped ring 45 is sandwiched between the inner wall surface (an inner circumferential surface) of the seal holding hole 28h and an outer circumferential surface of the channel tube 15 to become elastically deformed. In the present embodiment, more specifically, the O-shaped ring 45 is sandwiched among the inner wall surface of the seal holding hole 28h (the inner circumferential surface of the forceps pipe sleeve 28), the outer circumferential surface of the channel tube 15, and a wall surface of the partition wall 46, and is pushed against the respective surfaces (see solid arrows in FIG. 5) to become elastically deformed.

This brings the O-shaped ring 45 into elastic contact with the inner wall surface of the seal holding hole 28h, the outer circumferential surface of the channel tube 15, and the wall surface of the partition wall 46. In other words, by virtue of the restoring force, the O-shaped ring 45 comes into elastic contact at least with the inner wall surface of the seal holding hole 28h and the outer circumferential surface of the channel tube 15. Then, a contact stress (see open arrows in FIG. 5) of the O-shaped ring 45 brought into elastic contact produces frictional forces between the O-shaped ring 45 and the seal holding hole 28h and between the O-shaped ring 45 and the channel tube 15. Accordingly, the proximal end side of the channel tube 15 is held inside the tube insertion hole 28d.

A guide wall 47 as an auxiliary member is further provided inside the operation section 3 at a position corresponding to at least a part of a bending region A of the channel tube 15 and at a position that conforms to an outer side of bending of the channel tube 15.

The guide wall 47 is intended for, when a treatment instrument or the like inserted from the treatment instrument insertion opening 28a of the forceps pipe sleeve 28 passes through the bending region A in the channel tube 15, restricting the treatment instrument or the like pressing an inner wall of the channel tube 15 to move in a direction to the outer side of the bending. Thus, the guide wall 47 has a wall surface having a shape bending from the axial direction of the central axis O1 of the insertion section 2 in the axial direction of the central axis O2 of the forceps pipe sleeve 28 (that is, a shape bending along the bending shape of the channel tube 15). The treatment instrument or the like is thus prevented from moving in the direction to the outer side of the bending, and is guided to the insertion section side of the endoscope along bending of the wall surface of the guide wall 47. Herein, the direction to the outer side of the bending indicates a direction directed to the guide wall 47 as seen from the bending region A in the channel tube 15 (that is, a direction directed from the bending region A in the channel tube 15 toward the outer side of the bending of the channel tube 15).

Rigidity of the guide wall 47 is ensured by being made of a material more rigid than the material of the channel tube 15, and is formed integrally with the first enclosure member 30, for example.

Note that although the guide wall 47 is preferably made of a material more rigid than the material of the channel tube 15 as described above, rigidity may be ensured by changing the thickness (thickening) even if the same material is used, for example.

According to the embodiment having such a configuration, by bringing the O-shaped ring 45 into elastic contact at least with the channel tube 15 and the forceps pipe sleeve 28 in an elastically deformed state, and holding the proximal end side of the channel tube 15 inside the tube insertion hole 28d by means of the frictional forces caused by the contact stress of the O-shaped ring 45 brought into elastic contact, the proximal end side of the channel tube 15 can be connected to the forceps pipe sleeve 28 with a simple configuration and easy operability.

In other words, by providing the seal holding hole 28h for storing the O-shaped ring 45 in the distal end side of the forceps pipe sleeve 28 in a recessed manner, sandwiching the O-shaped ring 45 between the inner wall surface of the seal holding hole 28h and the outer circumferential surface of the channel tube 15 to become elastically deformed, and bringing the O-shaped ring 45 into elastic contact at least with the inner wall surface of the seal holding hole 28h and the outer circumferential surface of the channel tube 15, the proximal end side of the channel tube 15 can be connected to the forceps pipe sleeve 28 with a simple configuration and easy operability.

Since the endoscope 1 includes the operation section 3 provided on the proximal end side of the insertion section 2, the forceps pipe sleeve 28 having the treatment instrument insertion opening 28a for insertion of a treatment instrument and provided in the operation section 3 such that the axial direction of the central axis O2 passing through the treatment instrument insertion opening 28a is different from the axial direction of the insertion section 2, the flexible channel tube 15 caused to extend in a protruding manner inside the operation section 3 in a state bending from the proximal end of the insertion section 2 toward the forceps pipe sleeve 28 and connected to the forceps pipe sleeve 28 by insertion, and the guide wall 47 that is provided inside the operation section 3 and can come into contact with the outer side of the bending of the channel tube 15 by abutting on the channel tube 15, the proximal end side of the channel tube 15 can be appropriately connected to the forceps pipe sleeve 28 with a simple configuration and easy operation.

In other words, by adopting the configuration in which the channel tube 15 is connected to the forceps pipe sleeve 28 by insertion in the unbonded state, the channel tube 15 can be connected to the forceps pipe sleeve 28 without performing etching treatment or the like even in a case where the channel tube 15 is made of a material such as polytetrafluoroethylene having a low affinity with an adhesive. In this case, by providing the guide wall 47 inside the first enclosure member 30 to be able to come into contact with the outer side of the bending of the channel tube 15, it is possible to prevent the channel tube 15 from coming off the forceps pipe sleeve 28 more appropriately than in a case where there is the O-shaped ring alone even in a case where a force that presses the channel tube 15 in the direction to the outer side of the bending occurs in the bending region A of the channel tube 15 when inserting a treatment instrument or the like in the channel tube 15.

Further, by setting the angle formed by the central axis O2 of the opening (the treatment instrument insertion opening 28a) of the forceps pipe sleeve 28 and a tangent line to the guide wall 47 at a position where the guide wall 47 and the central axis O2 of the opening of the forceps pipe sleeve 28 intersect at less than or equal to 45 degrees as shown in FIG. 2, a force in a direction parallel to the guide wall 47 (that is, a force F2 of traveling in the channel tube 15) is larger than a force in a direction vertical to the guide wall 47 (that is, a force F1 in a direction of pressing the guide wall 47) in a force F of inserting the treatment instrument or the like. This minimizes pushing of the channel tube 15, and thus, prevention of coming off of the channel tube 15 can further be expected.

Since connection between the forceps pipe sleeve 28 and the channel tube 15 is a configuration obtained by mere insertion without bonding, it is not necessary to manage the length of the channel tube 15 from the proximal end of the insertion section 2 to the forceps pipe sleeve 28 very strictly as compared with a configuration in which the channel tube 15 is connected to the distal end side of the forceps pipe sleeve 28 by bonding or the like. In other words, insofar as a sufficient length for maintaining an insertion state of the channel tube 15 is ensured in the tube insertion hole 28d even in a case where an insertion depth of the channel tube 15 in the tube insertion hole 28d is slightly shallow, for example, a manufacturing error or the like can be absorbed by the tube insertion hole 28d even if the length of the channel tube 15 extending in a protruding manner from the proximal end of the insertion section 2 is made slightly shorter by the manufacturing error or the like. Consequently, it is easier to manage the length of the channel tube 15, and operability can be improved more.

By setting the inner diameter r2 in the second cylindrical hole 28g to be smaller than the inner diameter r3 in the tube insertion hole 28d and the inner diameter r2 in the second cylindrical hole 28g to be smaller than or equal to the inner diameter of the channel tube 15, a surface of the channel tube 15 on the proximal end side (a proximal end surface formed by the thickness of the channel tube 15) can fall within a projection plane of the abutting surface 28i. Consequently, also in a case of inserting a treatment instrument from the treatment instrument insertion opening 28a side along the first and second tapering holes 28, 28f and the like, it is possible to prevent a distal end of the treatment instrument from being caught (stuck) by the surface of the channel tube 16 on the proximal end side, and insertion performance of the treatment instrument can be improved.

Since the endoscope 1 of the present embodiment is a disposable endoscope and does not require cleaning at high temperature and high pressure, sealing of the connection part between the forceps pipe sleeve 28 and the channel tube 15 is not particularly required insofar as the treatment instrument is inserted in the channel tube 15. On the other hand, if the seal holding hole 28h that configures the inner circumference of the forceps pipe sleeve 28 and the outer circumference of the channel tube 15 are sealed with the O-shaped ring 45 which is a seal member, airtightness and liquid tightness of the connection part between the forceps pipe sleeve 28 and the channel tube 15 can be ensured. Employment of such a seal structure enables the channel tube 15 to be utilized not only for the application of allowing insertion of a treatment instrument or the like but also as an air feeding or water feeding channel. In this case, by providing the partition wall 46 to be opposed to the distal end of the forceps pipe sleeve 28 inside the first enclosure member 30, it is possible to appropriately prevent the O-shaped ring 45 from coming off the forceps pipe sleeve 28 with a simple configuration, and sealing performance can be maintained.

Since the partition wall 46 and the guide wall 47 are formed integrally with the first enclosure member 30, it is possible to appropriately prevent the number of components from increasing and achieve structural simplification.

Figure 6:
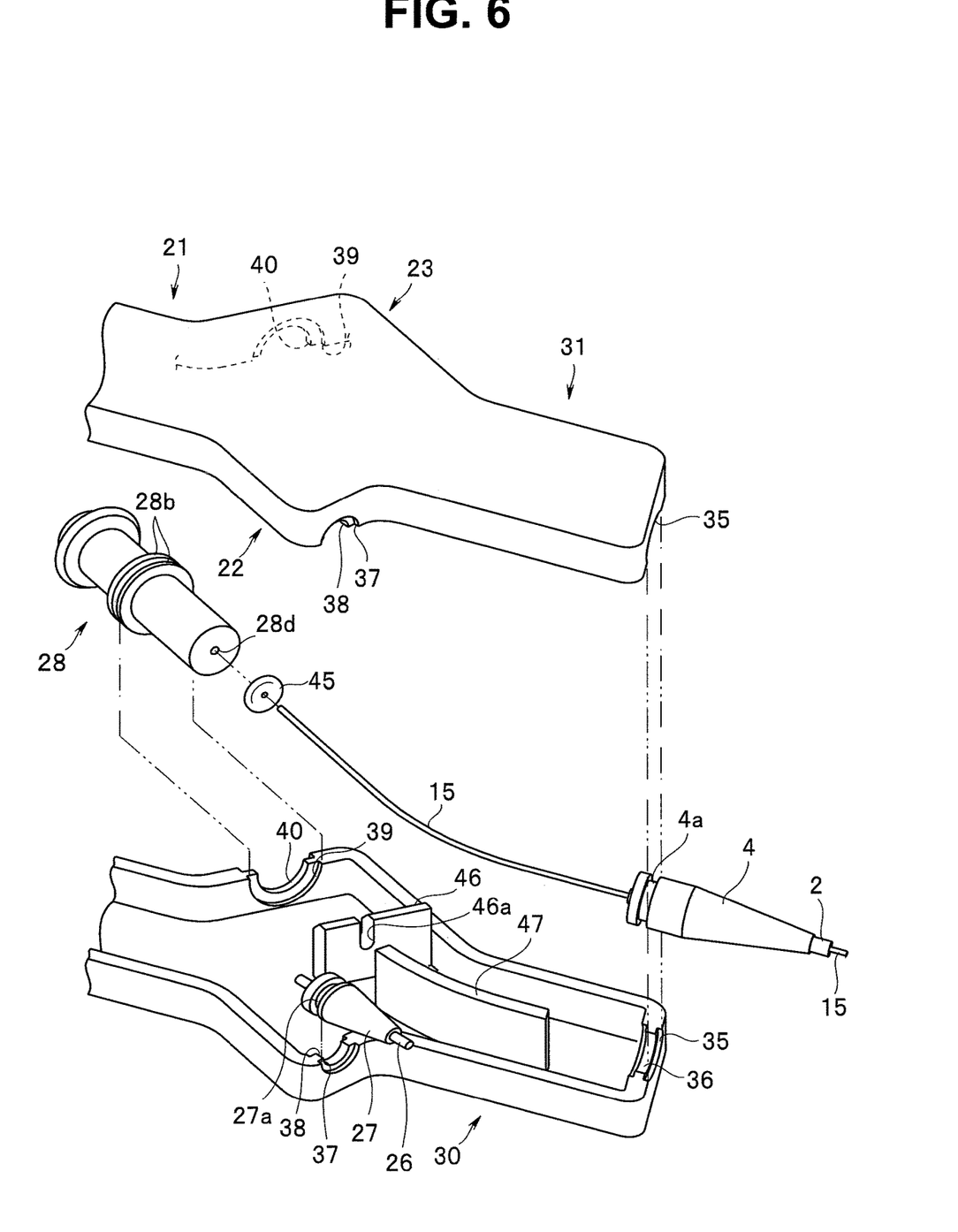
FIG. 6 is an exploded perspective view showing an essential part of an operation section according to a first modification.
Figure 7:
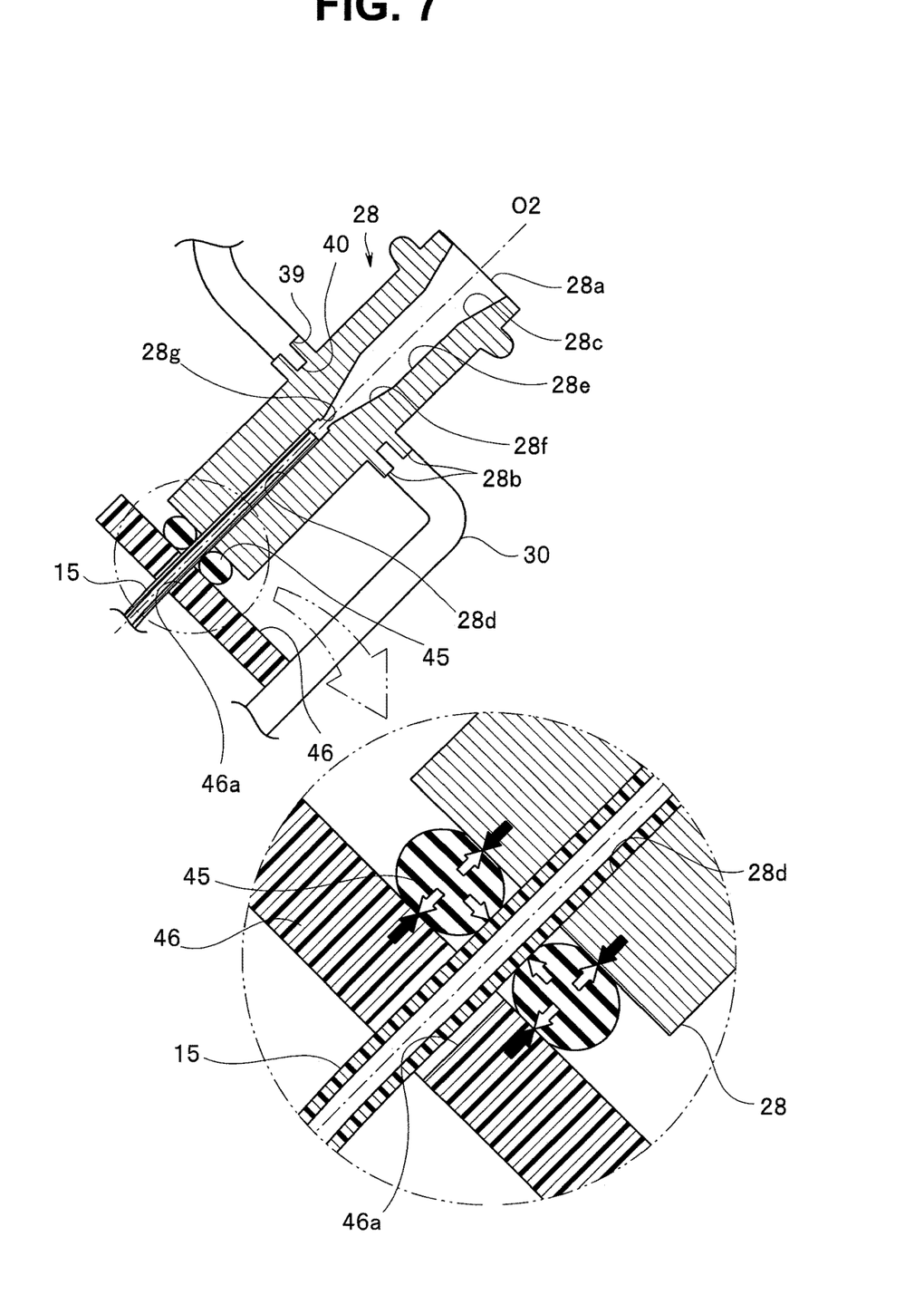
FIG. 7 is an explanatory diagram of a contact stress acted on an O-shaped ring according to the first modification.
Figure 8:
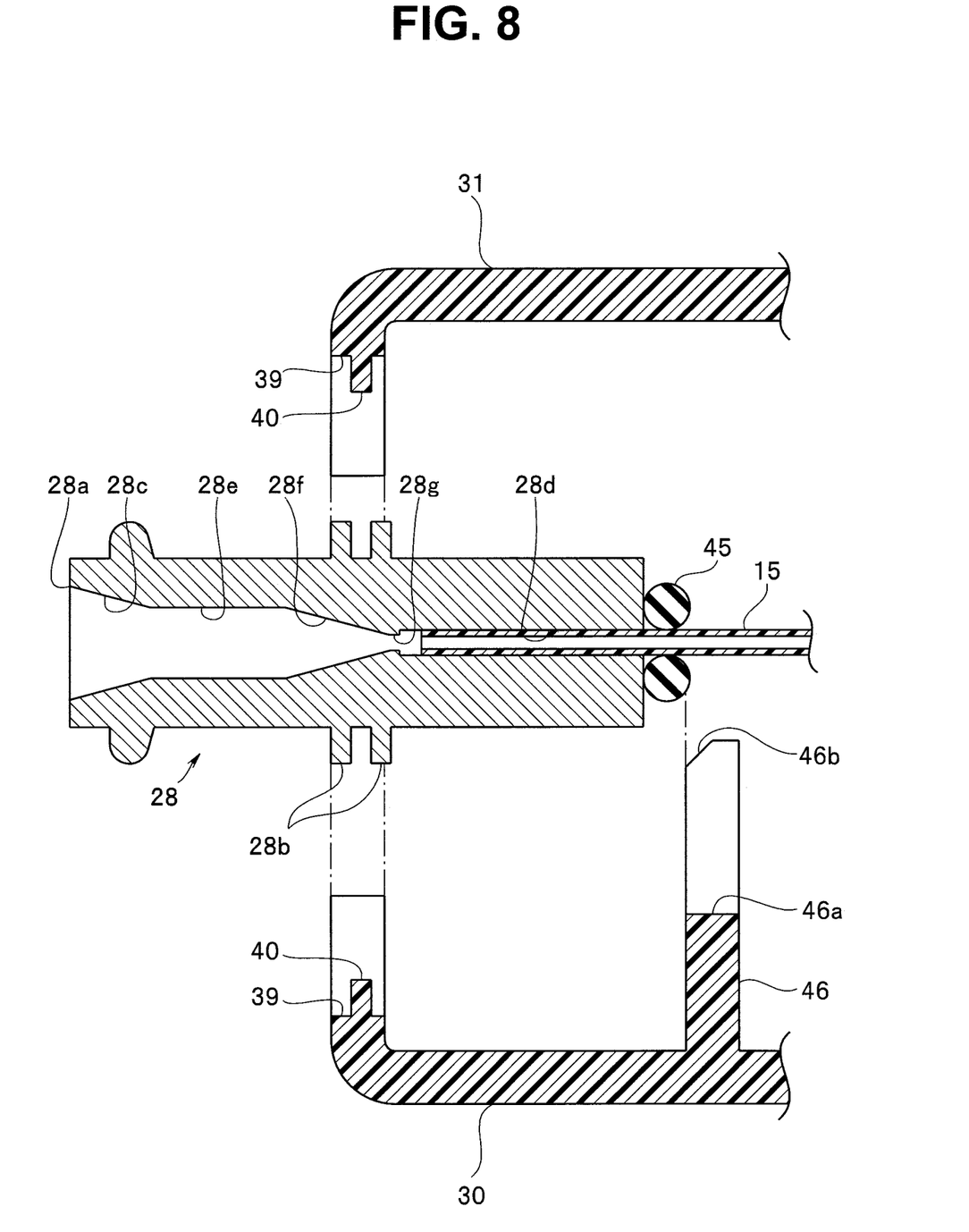
FIG. 8 is a cross-sectional view showing in an exploded manner the essential part of the operation section according to the first modification.

Herein, also in the forceps pipe sleeve 28 not having the seal holding hole 28h, the O-shaped ring 45 can also be sandwiched between the distal end surface of the forceps pipe sleeve 28 and the partition wall 46 opposed to the distal end surface of the forceps pipe sleeve 28 to become elastically deformed as shown in FIG. 6 to FIG. 8, for example. Then, by setting the interval between the distal end surface of the forceps pipe sleeve 28 and the partition wall 46 such that the O-shaped ring 45 as elastically deformed comes into elastic contact with the outer circumferential surface of the channel tube 15, effects similar to the effects of the above-described embodiment can be exerted.

In this case, in order to prevent the O-shaped ring 45 from being damaged by an edge of the partition wall 46 or the like when assembling the forceps pipe sleeve 28 to the first enclosure member 30 and the second enclosure member 31, it is desirable to form a tapering surface 46b in a distal end portion of the partition wall 46 as shown in FIG. 8, for example. In other words, by forming the tapering surface 46b tilted from the proximal end side to the distal end side in a direction away from the distal end surface of the forceps pipe sleeve 28 in the distal end portion of the partition wall 46, the O-shaped ring 45 can be arranged between the distal end surface of the forceps pipe sleeve 28 and the partition wall 46 without the O-shaped ring 45 being damaged by the partition wall 46 when assembling the forceps pipe sleeve 28 to the first enclosure member 30 and the second enclosure member 31.

Figure 9:
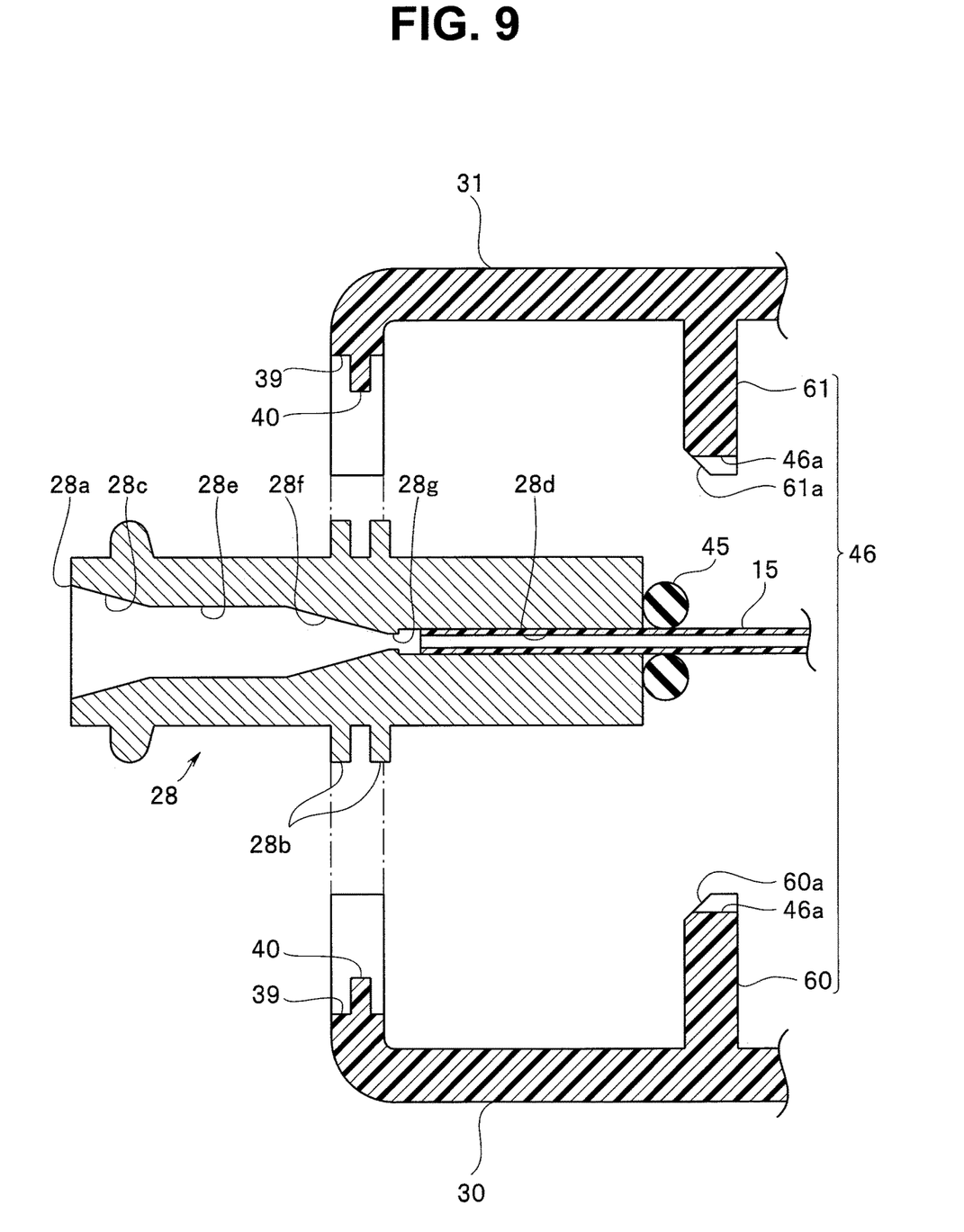
FIG. 9 is a cross-sectional view showing in an exploded manner an essential part of an operation section according to a second modification.

In a case where the partition wall 46 is formed separately of a picture wall part 60 on the first enclosure member 30 side and a picture wall part 61 on the second enclosure member 31 side as shown in FIG. 9, for example, tapering surfaces 60a, 61a can also be provided respectively in distal end portions of the respective picture wall parts 60, 61.

Note that the present invention is not limited to each embodiment described above, but various modifications and alterations can be made, and they also fall within the technical scope of the present invention. It goes without saying that components of the embodiment described above and components of each modification can be combined as appropriate.

What is claimed is:
1. An endoscope comprising:
an insertion section configured to be inserted into a body of a subject;
an operation section provided on a proximal end side of the insertion section;
a channel tube provided in a direction of a longitudinal axis of the insertion section, a proximal end side of the channel tube being arranged in the operation section; and
a pipe sleeve provided in the operation section and including a tube insertion hole on a distal end side of the pipe sleeve, the proximal end side of the channel tube being inserted in the tube insertion hole,
wherein
an inner diameter at a first position on a proximal end side of the pipe sleeve is larger than an inner diameter at a second position in a hole part that communicates with a proximal end of the tube insertion hole of the pipe sleeve, the inner diameter at the second position of the pipe sleeve is smaller than an inner diameter at a third position in the tube insertion hole, the pipe sleeve includes an abutting surface at the proximal end of the tube insertion hole, the abutting surface abutting on the proximal end side of the channel tube; and an inner diameter at a fourth position more distal on the pipe sleeve than the tube insertion hole is larger than the inner diameter at the third position.

2. The endoscope according to claim 1, further comprising an elastic material that abuts at least on the channel tube and the pipe sleeve, wherein the elastic material is brought into elastic contact at least with the channel tube and the pipe sleeve in an elastically deformed state, and the elastic material holds the proximal end side of the channel tube inside the tube insertion hole by a frictional force caused by a contact stress of the elastic material brought into the elastic contact.

3. The endoscope according to claim 1, wherein the first position is a proximal end of a tapering hole provided on the proximal end side of the pipe sleeve, the second position is a position of a cylindrical hole that communicates with the proximal end of the tube insertion hole and penetrates toward the tapering hole, and the third position is a portion that sets an inner diameter of the tube insertion hole.

4. The endoscope according to claim 2, wherein the pipe sleeve has an elastic material storage part that is provided on a distal end side of the tube insertion hole in a recessed manner and stores the elastic material, and the elastic material is sandwiched between an inner wall surface of the elastic material storage part and an outer circumferential surface of the channel tube to become elastically deformed, and comes into elastic contact at least with the inner wall surface of the elastic material storage part and the outer circumferential surface of the channel tube.

5. The endoscope according to claim 1, wherein the inner diameter at the second position is less than or equal to an inner diameter of the channel tube.

6. The endoscope according to claim 1, wherein the inner diameter at the third position is equal to an outer diameter of the channel tube.

7. The endoscope according to claim 1, wherein the fourth position is set in a recessed part provided in a recessed manner from a distal end of the pipe sleeve in a direction of a longitudinal axis of the pipe sleeve.

8. The endoscope according to claim 7, wherein the elastic material is sandwiched between an inner wall surface of the recessed part and an outer circumferential surface of the channel tube.

9. The endoscope according to claim 7, wherein the elastic material is an O-shaped ring, and the fourth position is a holding hole that stores the O-shaped ring.

10. The endoscope according to claim 1, wherein the channel tube is a tube containing polytetrafluoroethylene.

11. The endoscope according to claim 1, wherein the endoscope is a disposable endoscope.

12. The endoscope according to claim 1, wherein the abutting surface is a stepped surface provided between the second position and the third position.

13. The endoscope according to claim 1, wherein the inner diameter at the third position is smaller than the inner diameter at the first position.

* * * * *